March 9, 1943. M. S. DUNKELBERGER 2,313,709
FISHING BAIT OR LURE
Filed Jan. 17, 1941

INVENTOR
M. S. DUNKELBERGER,
BY Robb & Robb
ATTORNEY

Patented Mar. 9, 1943

2,313,709

UNITED STATES PATENT OFFICE 2,313,709

FISHING BAIT OR LURE

Milton S. Dunkelberger, Dayton, Ohio, assignor to The American Display Company, Dayton, Ohio, a corporation of Ohio Application January 17, 1941, Serial No. 374,933

17 Claims. (Cl. 43—46)

The present invention relates to fishing baits or lures, and more particularly to the type of such lures especially adapted for use in casting or trolling, comprising a body of wood or other suitable material having a shape somewhat along the lines of a small fish and carrying hooks.

The primary object of the present invention is the provision of a bait of the type described, which is adapted to very closely simulate, when being drawn through the water, the erratic swimming movement of a small fish.

Another principal object of the invention is the provision of a bait of the type described, which has a very substantial wobbling or wriggling motion when being drawn through the water at extremely slow speed.

Another object of the invention is the provision of a lure of the class described which has a fin or deflector which is readily manipulatable either to cause the lure to dive and swim deeply or to swim close to the surface of the water when drawn therethrough by an attaching line or the like.

Still another object of the invention is to provide a bait of this type which may be caused to have imparted thereto a periodic flopping or jumping action as the bait is being drawn through the water under a steady pull of the towing line, in simulation of the like action of a small fish when swimming.

Under certain types of fishing conditions, well known to those skilled in the art, it is desirable to have a bait suitable for casting long distances, which upon striking the water may be drawn very slowly over the desired location with a very substantial wobbling or wiggling action of the bait in the water at such slow speed. Heretofore the baits meeting such requirements have been required to be of such light construction and so delicately balanced as either to make them unduly expensive or unsuitable for use by the average fisherman not possessing a sufficiently flexible rod, or the requisite skill, to cast such baits for long distances.

It is, therefore, an object of this invention to provide a bait having the desired characteristics of an extreme wobbling action when drawn through the water at very slow speed, which, however, is not of a design requiring very delicate balance, so that it is capable of being made in various sizes and weights so as to be capable of long distance casting by more or less inexpert fishermen employing appropriately modest and inexpensive rod equipment.

In general, my invention consists in the provision of an all-purpose bait, capable of swimming either deep or shallow with a substantial wiggling action, or with such action together with a periodic alternate, jumping and diving action, the desired action of the bait being pre-determined by simple manipulation thereof prior to placing the same in the water, and the said desired action of the bait is capable of being produced while the same is drawn through the water under a steady pull of the towing line.

Other objects, advantages and features of novelty of the invention will appear more fully as the description thereof progresses in conjunction with the accompanying drawing, wherein.

Figure 1:
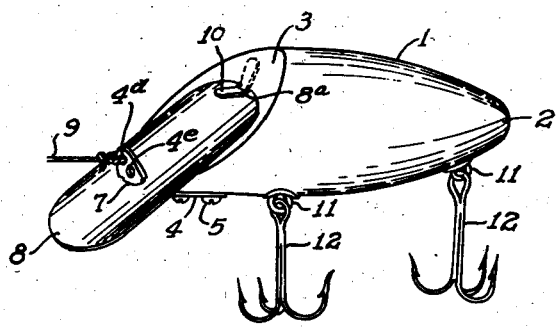
Figure 1 is a perspective view of the fishing bait or lure embodying the invention, and showing the deflector or fin engaged by the adjustable fastening means to lie adjacent the body of the bait in the plane of inclined forward end thereof.

Now referring to the drawing, for a detailed description of the invention, the numeral I designates the body of the lure, which may be made of wood, cork or any suitable material which is buoyant preferably so that the lure will float when placed in the water. The body of the lure may be rounded at the rear end, as at 2, and, in general, the body I is of a shape simulating that of a small fish.

Figure 2:
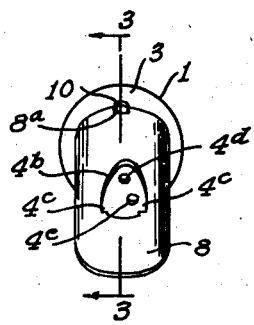
Figure 2 is a view looking toward the forward end of the bait, the body and fin or deflector elements being in the same relation as described in connection with Figure 1.

The forward or nose end 3 of the body I is inclined forwardly and downwardly and presents the broad, forward face, as shown best in Figures 1 and 2. This forward face 3 is preferably concaved transversely, as shown best in Figures 3 and 4.

An angle bracket 4 is secured to the underside of the body I, as by means of screws 5. The portion of the bracket 4 extending beyond the forward extremity of the body I is bent at an angle to the longitudinal axis, represented by the dotted line 6, of the body 1, and at the point of the angle said bracket 4 extends through a suitable slot 7 in the fin or deflector 8. The slot 7 is slightly larger than the neck portion 4a of the bracket 4 so that the fin or deflector 8 is loosely pivotable upon said neck portion 4a. The line-attaching portion 4b of the bracket 4 is slightly enlarged just beyond the neck portion 4a to form the shoulders 4c, which engage the side of the fin or deflector 8 away from the body 1 to maintain said fin or deflector 8 upon the bracket 4.

The line-attaching portion 4b of the bracket 4 is provided with two holes 4d and 4e, the hole 4d being in the vertical plane of the longitudinal axis (represented by the line 3—3 in Figure 2) of the body 1 and the hole 4e being to one side of the vertical plane of the longitudinal axis of the body 1, all as seen best in Figure 2. The holes 4d and 4e are for the attachment of a towing line 9 to the bait and the purpose of their location, as just described, will appear more fully hereinafter.

Figure 3:
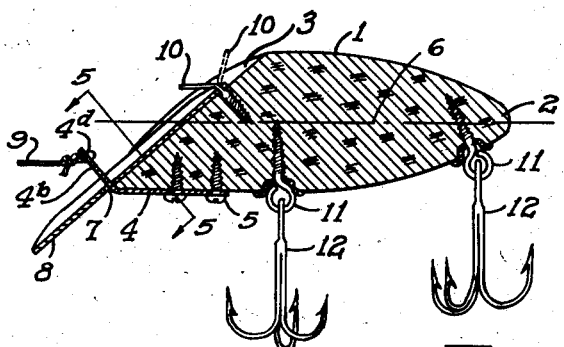
Figure 3 is a longitudinal vertical sectional view of the bait with the respective elements in the same relation as that described in connection with Figures 1 and 2, the section being taken on the line 3—3 of Figure 2.
Figure 5:
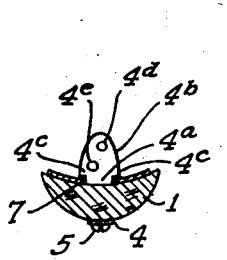
Figure 5 is a sectional view taken on the line 5—5 of Figure 3 looking in the direction of the arrow.

The fin or deflector 8 is preferably formed of metal or other suitable material, somewhat heavier than the material of the body 1, and is concaved transversely conformably to the front face or nose portion 3 of the body 1, against which a portion of the fin 8 is adapted to lie under certain conditions of use of the fishing bait or lure of the invention. The upper portion of the fin or deflector 8 is provided with a slot 8a for engagement with a lock screw 10 upon proper manipulation of the latter when it is desired to maintain the fin engaged with the face or nose portion 3 of the body 1, as shown in Figures 1 to 3.

It will be noted that a portion of the fin 8 extends beyond the extremities of the body 1 proper; that the pivotal axis of the fin 8, while preferably in the vertical plane of the longitudinal axis of the body 1, is not in the horizontal plane of the longitudinal axis of the body 1; and that the line-attaching openings 4d and 4e are not in the horizontal plane of the longitudinal axis of the body 1, although one of said holes, namely 4d, is preferably in the vertical plane of the longitudinal axis of the body. As shown in the drawing, both the pivotal axis of the fin 8 and the line-attaching holes 4d and 4e are all preferably located below the longitudinal axis of the body 1.

It will also be noted that by reason of the formation of the slot 7 to substantially fit the transversely extended neck 4a of the bracket 4, while the plate 8 may pivot upon the bracket 4, said fin 8 cannot rotate relatively to said bracket. In other words, the fin 8 is prevented from any substantial movement transversely of the longitudinal axis of the body 1.

While it is not at the present time known whether all or any of the features to which attention has just been particularly directed are essential, it is believed that they are all highly important to the accomplishment of the results which I am able to secure in the use of my invention.

Eye screws 11 extending into the body 1 are provided for the attachment of hooks 12 in accordance with the usual practice.

In the use of my invention, the fin 8 may be positioned, as in Figure 1, with its upper portion flat against the forward face or nose portion 3 of the body 1, and the screw lock 10 turned from the dotted line to the full line position to maintain such engagement of the fin 8 with the body 1. Now if the line 9 is attached to the hole 4d, which is in the vertical plane of the longitudinal axis of the body 1, and the bait is drawn through the water by means of the towing line 9, the bait will be caused to dive and/or swim deep below the surface of the water, depending upon whether the towing line 9 is pulled with a jerking motion or with a steady, even pressure. While the bait is thus being pulled through the water, the forward end of the bait will be caused to swing from side to side with a sort of pendulous movement of the lower extremity of the fin 8, producing a very substantial wiggling or wobbling motion of the bait as it is drawn through the water even under a steady, even pull of the towing line 9 at very slow speed, such as for instance one foot per second.

With the fin 8 in the same relation to the body 1, as shown in Figures 1 to 3, namely, with the fin 8 locked against the face 3, the towing line may be attached to the hole 4e, which is to one side of the vertical plane of the longitudinal axis of the body 1. Now when the bait is drawn through the water it will dive and/or swim deep as before, and likewise it will wobble from side to side, the lower end of the fin 8 moving in a sort of pendulous manner, but the swing instead of being in an arc equally divided on either side of the longitudinal axis, as in the first instance, will be in an arc, the greater portion of which extends toward that side of the vertical plane of the longitudinal axis of the body 1 upon which the hole 4e is located. Thus, a somewhat different and rather peculiar wobbling action of the bait as it is drawn through the water is produced. As the bait is drawn through the water, the arc of movement increases during each successive pendulous swing, and since the swing is more toward one side than the other, the bait will periodically turn completely over, usually flopping out of the water somewhat after the manner of a minnow jumping, then dropping back into the water to go deep again until the arc of movement of the pendulous swing has sufficiently increased for another jump.

Figure 4:
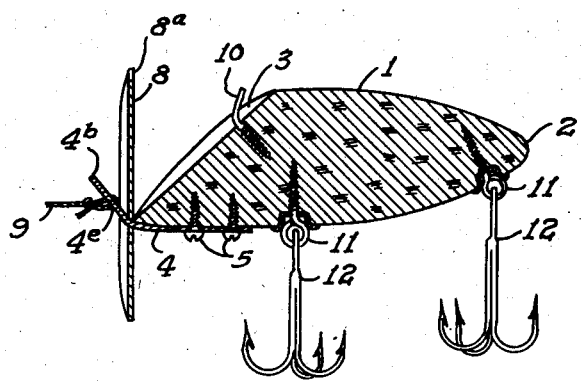
Figure 4 is a longitudinal vertical sectional view of the bait similar to Figure 3, but showing the fin or deflector disengaged from the means fastening one end thereof to the body.

If it is desired that the bait shall travel or swim shallow, or close to the surface of the water, when being pulled, the lock screw 10 will be turned from the full line position, shown in Figures 1 and 3, to the dotted line position shown in said figures, or to the full line position of Figure 4, and this will release the fin 8 so that it may assume the position shown in the latter figure when the bait is being drawn through the water by the towing line 9. Under such condition, namely, with the lock screw 10 dis-engaged from the fin 8, the latter will be enabled to loosely pivot about the neck portion 4b of the bracket 4, and the fin 8 will be caused to assume a substantially vertical position when the bait is drawn through the water on account of the equal pressure of the water on either side of the pivotal axis, and, consequently, the bait will be caused to swim shallow or near the surface of the water.

Under such condition, the bait may be caused to have imparted thereto either of the wobbling actions above described, dependent upon whether the towing line 9 is engaged with the hole 4d, or whether it is engaged with the hole 4e. With the lock means 10 disengaged from the fin 8, and the towing line 9 attached to the hole 4d, the bait will have the wobbling motion or action first described when pulled through the water, with the pendulous swing of the lower end of the fin 8 extending substantially the same distance on either side of the longitudinal axis of the body 1 during each swing.

With the fastening means 10 disengaged from the fin 8, and the towing line attached to the hole 4e, the bait will be caused to swim shallow or adjacent the surface of the water when it is being drawn therethrough and the bait will have imparted thereto the peculiar wobbling action, wherein the pendulous swing of the lower end of the fin 8 is more toward one side of the longitudinal axis of the body 1 than toward the other, with the resultant periodic complete turning over of the bait to cause it to flop out of the water in simulation of a minnow jumping.

With the towing line 9 attached to the hole 4e and the fin 8 either engaged with the fastening means 10 or disengaged therefrom, the pendulous swing of the fin 8 as the bait is pulled through the water will be partially spiral, due to the fact that the bait is being pulled from one side of the vertical plane of its longitudinal axis, said swing becoming completely spiral when the arc of movement of the fin 8 has increased sufficiently to cause complete turning over of the bait. The action under the conditions just referred to is comparable to a propeller action with the fin 8 having a pitch with reference to the line of movement of the bait which is responsible for producing the periodic turning over of the bait which would not otherwise occur if the plane of the fin 8 had the same angle, at each extremity of its swing, to the line of movement of the bait, as when the latter is being towed from the hole 4d.

It will be noted that the fin or deflector 8, being made of material heavier than the body 1 and extending beyond the forward extremity of the body, provides a weighted extension at the forward end of the body which will cause the forward end of the body to nose downwardly when the bait is placed in the water, and this weighted extension acts in the manner of a pendulum when the lure is drawn through the water.

It will also be noted that when the fin 8 is engaged by the fastening means 10 so as to be positioned as shown in Figure 1, in view of the fact that the fin and the forward end 3 of the body are similarly concaved transversely, the water with which the forward end of the lure impinges has an unobstructed passage upwardly along the surface of the fin 8, the forward end 3 of the bait, and over the top of the body 1. This causes the forward end of the body to sink downwardly or dive as the lure is drawn through the water.

From the foregoing it will be seen that the invention provides a very simply constructed fishing bait, or lure, capable of meeting several different conditions of casting, or trolling, upon simple manipulation of the lock means 10 and attachment of the towing line to one or the other of the holes 4d or 4e in the towing piece 4b.

Having thus described my invention, what I claim as new and desire to secure by Letters Patent of the United States is:

1. In a fishing lure of the class described, in combination, a body member, a guiding fin member pivotally mounted thereon for pivotal movement to different guiding positions, and fastening means on the body engageable with the fin to secure it against pivotal movement in one of said guiding positions, said fin being pivotal to another of said positions upon disengagement of said means from association with said edge of said fin.

2. In a fishing lure of the class described, in combination, a body member, a guiding fin member pivotally mounted thereon for pivotal movement to different guiding positions, fastening means on the body engageable with the fin to secure it against pivotal movement in one of said guiding positions, and means for attaching a towing line to the body at a point below the longitudinal axis thereof.

3. In a fishing lure of the class described, in combination, a body member, a guiding fin member pivotally mounted thereon for pivotal movement to different guiding positions, fastenings means on the body engageable with the fin to secure it against pivotal movement in one of said guiding positions, and means for attaching a towing line to the body at a point below the longitudinal axis thereof and to one side of the vertical pane of said axis.

4. In a fishing lure of the class described, in combination, a body member, a guiding fin member pivotally mounted thereon for pivotal movement to different guiding positions, fastening means on the body engageable with the fin to secure it against pivotal movement in one of said positions, means for attaching a towing line to the body at a point below the longitudinal axis thereof and to one side of the vertical plane of said axis, and means for attaching a towing line to the body at a point below the longitudinal axis thereof and in the vertical plane of said axis.

5. In a fishing lure of the class described, in combination, a body member having a forwardly and downwardly sloping forward end, a guiding fin member pivotally mounted thereon for pivotal movement to different guiding positions, the pivotal axis of said fin member being adjacent the lower forward extremity of the sloping forward end of the body and said fin member having a portion extending away from the body beyond the lower forward extremity thereof, fastening means on the body engageable with the fin to secure it against pivotal movement in one of said guiding positions, and means for attaching a towing line to said body at a point below the longitudinal axis thereof and at one side of the vertical plane of said axis.

6. In a fishing lure of the class described, in combination, a body member having a forwardly and downwardly sloping forward end, a guiding fin member pivotally mounted thereon for pivotal movement to different guiding positions, the pivotal axis of said fin member being adjacent the lower forward extremity of the sloping forward end of the body and said fin member having a portion extending away from the body beyond the lower forward extremity thereof, fastening means on the body engageable with the fin to secure it against pivotal movement in one of said guiding positions, and means for attaching a towing line to said body at a point below the longitudinal axis thereof and at one side of the vertical plane of said axis, and means for attaching a towing line to said body at a point below the longitudinal axis thereof and in the vertical plane of said axis.

7. In a fishing lure of the class described, in combination, a body member terminating in a bevelled surface area, a guiding fin member pivotally mounted at the forward end of the body member for pivotal movement into and out of engagement with the bevelled surface at the forward end of the body member, and means on the body member movable into engagement ovr one edge of the fin to maintain the same in said surface engagement with the body member.

8. In a fishing lure of the class described, in combination, a body member, a guiding fin member pivotally mounted at the forward end of the body member for pivotal movement to different guiding positions at different degrees of angularity respecting the longitudinal axis of said body member, and a lock screw on said body member engageable over one edge of said fin to retain the same in one of said guiding positions.

9. A fishing lure as claimed in claim 7, wherein the pivotal axis of said fin is located at a point below the central longitudinal axis of said body member.

10. A fishing lure as claimed in claim 7, combined with towing means on the body having means for attaching a towing line thereto at a point below the longitudinal axis of said body member.

11. A fishing lure as claimed in claim 7, combined with towing means on the body having means for attaching a towing line thereto at a point below and to one side of the vertical plane of longitudinal axis of said body member.

12. A fishing lure as claimed in claim 7, combined with towing means on the body having means for attaching a towing line thereto at a point below and in the vertical plane of the longitudinal axis of the body member, said towing means also having means for attaching a towing line thereto at a point below and to one side of the vertical plane of said axis.

13. In a fishing lure of the class described in combination, a body member having a forwardly and downwardly inclined forward end, a towing piece secured to the body and extending from the lower extremity of said inclined forward end, a guiding fin member pivotally mounted on said towing piece for pivotal movement into and out of surface engagement with said inclined forward end of the body in the plane thereof, and means on said body member movable into and out of engagement with said fin member to retain the same in said surface engagement with the body member, said towing piece having means for attaching a towing line thereto at a point below and in the vertical plane of the longitudinal axis of the body member, and said towing means also having means for attaching a towing line thereto at a point below and to one side of the vertical plane of said axis.

14. A fishing lure as claimed in claim 13, wherein the fin member is mounted for pivotal movement about a horizontal axis, said axis being immediately adjacent the lower extremity of the inclined forward end of the body member, and wherein said towing piece has a portion extending forwardly of the fin member, and wherein the said means provided in the towing means comprises openings in said portion for the purpose described.

15. A fishing lure as claimed in claim 7, wherein the forward end of the body is concaved transversely and the fin member is concaved transversely conformable thereto.

16. In a duo-functional fishing lure adapted for different depths of fishing, in combination a body member having a bevelled forward end, a guiding fin member pivotally mounted at the forward end of the body member for pivotal movement into and out of surface engagement with the bevelled surface at the forward end of the body, and means for attaching the fin member to maintain the same in surface engagement with the bevelled surface of the body member, so that when the fin member is attached by said means the lure as it is drawn through the water maintains a different depth from the depth it normally maintains when the fin member is not held in engagement with the bevelled surface.

17. In a duo-functional fishing lure adapted for both shallow and deep fishing as described, the combination including a line, a body member terminating in a bevelled surface at the forward end thereof, said bevelled surface extending downwardly and forwardly, a fin member pivotally attached to the bevelled surface at the forward end of the body member, adjustable means for attaching the fin member to the body member so as to hold the fin member in contact with the bevelled surface, said fin member extending downwardly and forwardly below and forward from the body member whenever the fin member is held in contact with the bevelled surface to cause the lure to seek a lower level when drawn through the water than when the fin member is not held against the bevelled surface, and means for connecting the line to one side of the longitudinal axis of the body member.

MILTON S. DUNKELBERGER.